United States Patent
Mather et al.

(10) Patent No.: US 7,225,313 B2
(45) Date of Patent: May 29, 2007

(54) DEMOTION OF MEMORY PAGES TO LARGEST POSSIBLE SIZES

(75) Inventors: Clifford James Mather, San Jose, CA (US); Shashikanth Lakshmikantha, Sunnyvale, CA (US); Harold B. Prince, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 10/818,103

(22) Filed: Apr. 5, 2004

(65) Prior Publication Data
US 2005/0223321 A1  Oct. 6, 2005

(51) Int. Cl.
*G06F 12/00* (2006.01)
(52) U.S. Cl. ............... 711/170; 711/171; 711/172; 711/173
(58) Field of Classification Search ............... None
See application file for complete search history.

(56) References Cited

U.S. PATENT DOCUMENTS

| | | | |
|---|---|---|---|
| 6,016,535 A * | 1/2000 | Krantz et al. | 711/171 |
| 6,141,737 A * | 10/2000 | Krantz et al. | 711/171 |
| 6,233,652 B1 | 5/2001 | Matthews et al. | |
| 6,374,341 B1 | 4/2002 | Nijhawan et al. | |
| 6,625,715 B1 | 9/2003 | Mathews et al. | |
| 6,651,156 B1 | 11/2003 | Courtright et al. | |
| 7,003,647 B2 * | 2/2006 | Jacobs et al. | 711/207 |
| 2003/0196066 A1 | 10/2003 | Mathews | |

* cited by examiner

*Primary Examiner*—Than Nguyen

(57) ABSTRACT

Various approaches for demoting a memory page are described. In one approach, a first new page is established from a subpage of a base page in response to a request to demote a specified subpage. The size of the first new page is selected from a plurality of page sizes. For each portion of the base page less the first new page, the portion is divided into one or more pages of a selected size. The selected size for the pages is a largest of the plurality of page sizes that is less than or equal to the size of the portion. If the new one or more pages do not encompass the entire portion, a new feasible, largest of the sizes is selected and the part of the portion not encompassed is further divided into one or more pages.

19 Claims, 4 Drawing Sheets

| 350 | DEMOTE PAGE (subpage_pointer, required_page_size) | |
|---|---|---|
| 352 | Find the first subpage of the base page | |
| 354 | Set current_page_size to the size of the base page | |
| 356 | While (current_page_size != required_page_size) | |
| 358 | | Set current_page_size to the next smallest page size |
| 360 | | Demote the base page to pages of the current_page_size |
| 362 | | Find the first sub-page of the new base page |

FIG. 3B

DEMOTION OF MEMORY PAGES TO LARGEST POSSIBLE SIZES

FIELD OF THE INVENTION

The present disclosure generally relates to demoting a memory page.

BACKGROUND

A virtual memory system allows the logical address space of a process to be larger than the actual physical address space in memory that is occupied by the process during execution. The virtual memory system expands the addressing capabilities of processes beyond the in-core memory limitations of the host data processing system. Virtual memory is also important for system performance in supporting concurrent execution of multiple processes.

Various hardware and software mechanisms are used in translating virtual addresses to physical addresses. For example, a translation look-aside buffer (TLB) in a virtual memory system is a cache of recently accessed virtual-to-physical page address translations. The TLB may be implemented as a hardware structure in order to reduce the time taken to translate virtual to physical addresses and thereby improve system performance.

It has been recognized that system performance may benefit from the availability of different sizes of virtual memory pages. An application using a large page for certain data may benefit system performance where large blocks of data are contiguously stored in retentive storage. The availability of large pages may reduce contention for TLB resources. For example, without large pages multiple smaller pages would be required for the same data, and multiple pages would require multiple entries in the TLB. A large page leaves space in the TLB for other entries for other pages. Whether it is beneficial to store data in a large page or a small page depends on application requirements.

Circumstances may arise during the course of executing a process that make demoting a page desirable. Demotion generally involves dividing a page into multiple smaller pages. An example situation leading to demotion of a page involves requiring exclusive access to a portion of a page. Generally, the hardware may require the access characteristics for a page to be consistent across the entire page. Unless the single page is divided into multiple pages, there is no way to specify different access characteristics for different portions of the original page. It maybe desirable to demote a page because separating the portion of the a page denoted for exclusive access from the portion(s) that are not denoted for exclusive access by making multiple pages makes those portions not denoted for exclusive access accessible while access to the other portion is restricted.

Even though demoting a page may have the previously mentioned benefits, there may be negative implications for TLB performance. Specifically, a page that once occupied one entry in the TLB would after demotion occupy multiple entries in the TLB. This reduces the number of TLB spaces that are available for other processes. The system would then have to invoke replacement strategies to make room for pages of other processes or resort to translating a virtual address to a physical address during program execution.

SUMMARY

The various embodiments of the invention provide various approaches for demoting a memory page. In one approach, a first new page is established from a subpage of a base page in response to a request to demote a specified subpage. The size of the first new page is selected from a plurality of page sizes. For each portion of the base page less the first new page, the portion is divided into one or more pages of a selected size. The selected size for the pages is a largest of the plurality of page sizes that is less than or equal to the size of the portion. If the new one or more pages do not encompass the entire portion, a new feasible, largest of the sizes is selected and the part of the portion not encompassed is further divided into one or more pages.

It will be appreciated that various other embodiments are set forth in the Detailed Description and Claims which follow.

BRIEF DESCRIPTION OF THE DRAWINGS

FIG. 3B illustrates an example process for demoting a page in accordance with various embodiments of the invention.

DETAILED DESCRIPTION

Figure 1:
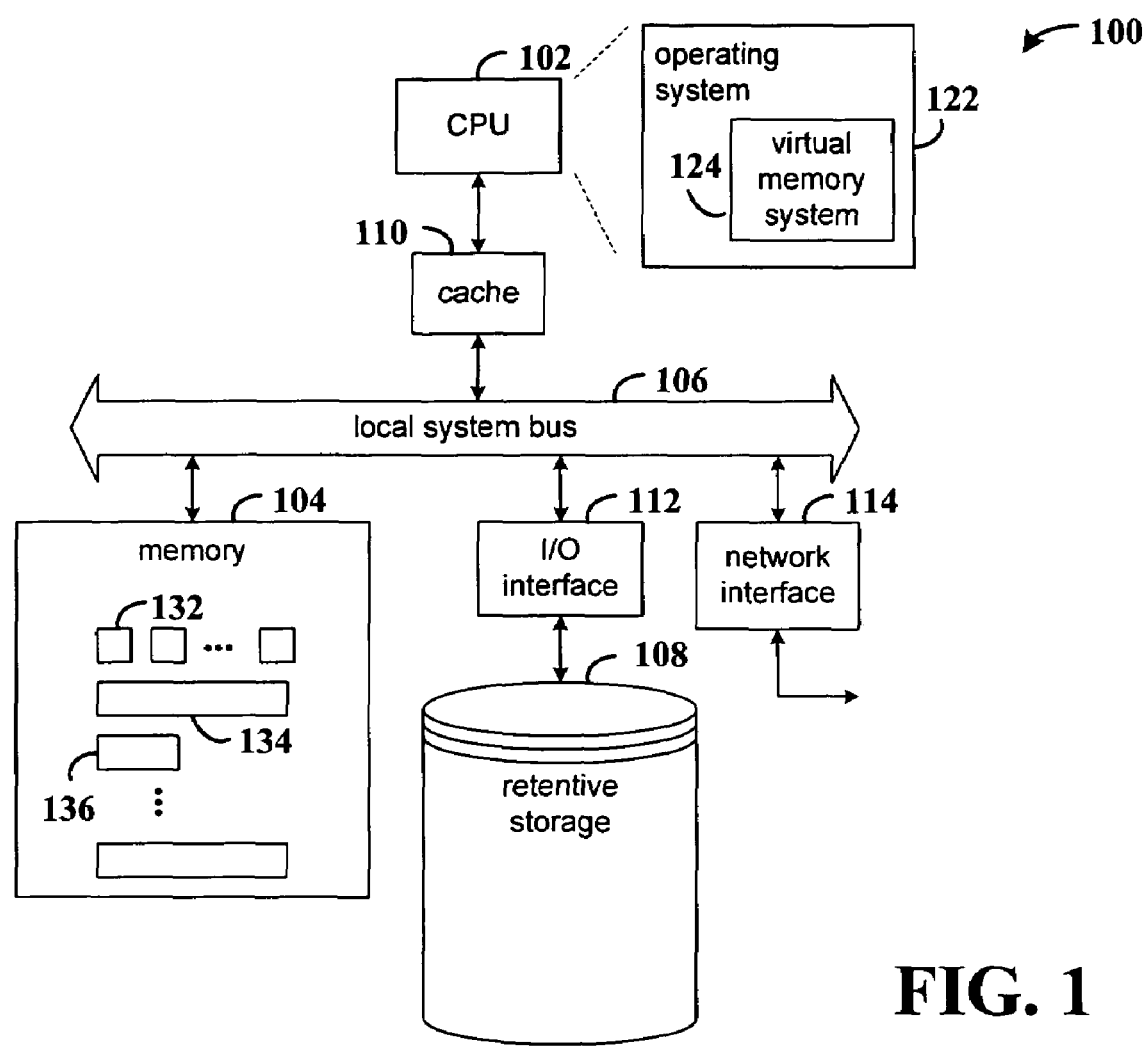
FIG. 1 is a block diagram that illustrates an example data processing system 100 and example pages of memory managed by a virtual memory system.

FIG. 1 is a block diagram that illustrates an example data processing system 100 and example pages of memory managed by a virtual memory system. The data processing system includes a central processing unit (CPU) 102 that is coupled to a memory subsystem 104 via a local system bus 106 (address and data). The memory subsystem occupies a level in a hierarchical storage arrangement that includes retentive storage 108, memory 104, and cache 110. Data in retentive storage may be accessed via an I/O interface 112 between the retentive storage and the bus. One objective of a hierarchical storage arrangement is to provide fast access for the CPU 102 to frequently accessed data (or instructions). Data in the cache may be referenced faster than references to data in the memory subsystem, and data in the memory subsystem may be referenced faster than the data in the retentive storage. Retentive storage, for example, magnetic or optical disks, magnetic tapes, or even flash memories may be used to store data that is expected to survive termination of a referencing process or loss of power to the system. In terms of relative storage capacity, retentive storage provides more space than the memory subsystem, and the memory subsystem provides more space than the cache. The system 100 may also include a network interface 114 for providing access to network resources such as network storage.

Operating system 122 includes program instructions that are executed by CPU 102 for managing the resources of system 100. One functional component of the operating system is the virtual memory system 124. The virtual memory system maintains an address space that is used by the operating system and other programs executing on the CPU. With retentive storage 108 as a backing store, programs may address virtual memory beyond the size of memory subsystem 104. The virtual memory system manages the mapping of virtual memory addresses to physical memory addresses in the memory subsystem, as well as the swapping of pages between the retentive storage and the memory subsystem. "Page" is a term often used to describe a quantity of contiguous storage used by a virtual memory system in swapping data between retentive storage and the memory subsystem. Pages are contiguous one to another and aligned at addresses according to page size. In aligning pages with addresses, the address of the page is a multiple of the page size. For example, a 4 KB page may be aligned on addresses 0, 4096, 8192, etc.

Some virtual memory subsystems support multiple page sizes. Different page sizes in the memory subsystem are illustrated by the different sizes of blocks 132, 134, and 136. The pages in the memory subsystem are backed by space in retentive storage 108.

Demoting a page refers to changing a single virtual memory page into multiple smaller virtual memory pages. The demotion operation is available in virtual memory systems in which multiple page sizes are supported. If a process requires exclusive access to a portion of a page, the virtual memory system may demote the page to two or more smaller pages, with one of the new smaller pages containing the portion to which exclusive access is sought. In demoting a page in various embodiments of the invention, the virtual memory system divides the target page into pages that are as large as permitted by architectural constraints taking into account the size page needed for the event giving rise to the demotion. For example, if page sizes of 4 KB, 16 KB, 64 KB, and 256 KB are supported, the target page is 256 KB, and the portion of the target page for which exclusive access is sought is less than 4 KB, then a 4 KB virtual page may be established for the portion and the remaining portions of the target page established as some combination of 64 KB, 16 KB, and 4 KB pages depending on the position of the portion in the original page. The virtual page sizes chosen for each remaining portion are selected based on the largest of the available page sizes that fits within the portion.

In addition to reducing TLB activity, the various embodiments of the invention allow the underlying physical page allocator to work with larger units of memory. This may reduce memory fragmentation and allow the allocator to work more efficiently. For example, if there is too much fragmentation, the availability of large (physical) pages may be reduced, thereby causing applications to use small pages.

Figures 2A, 2B, 2C:
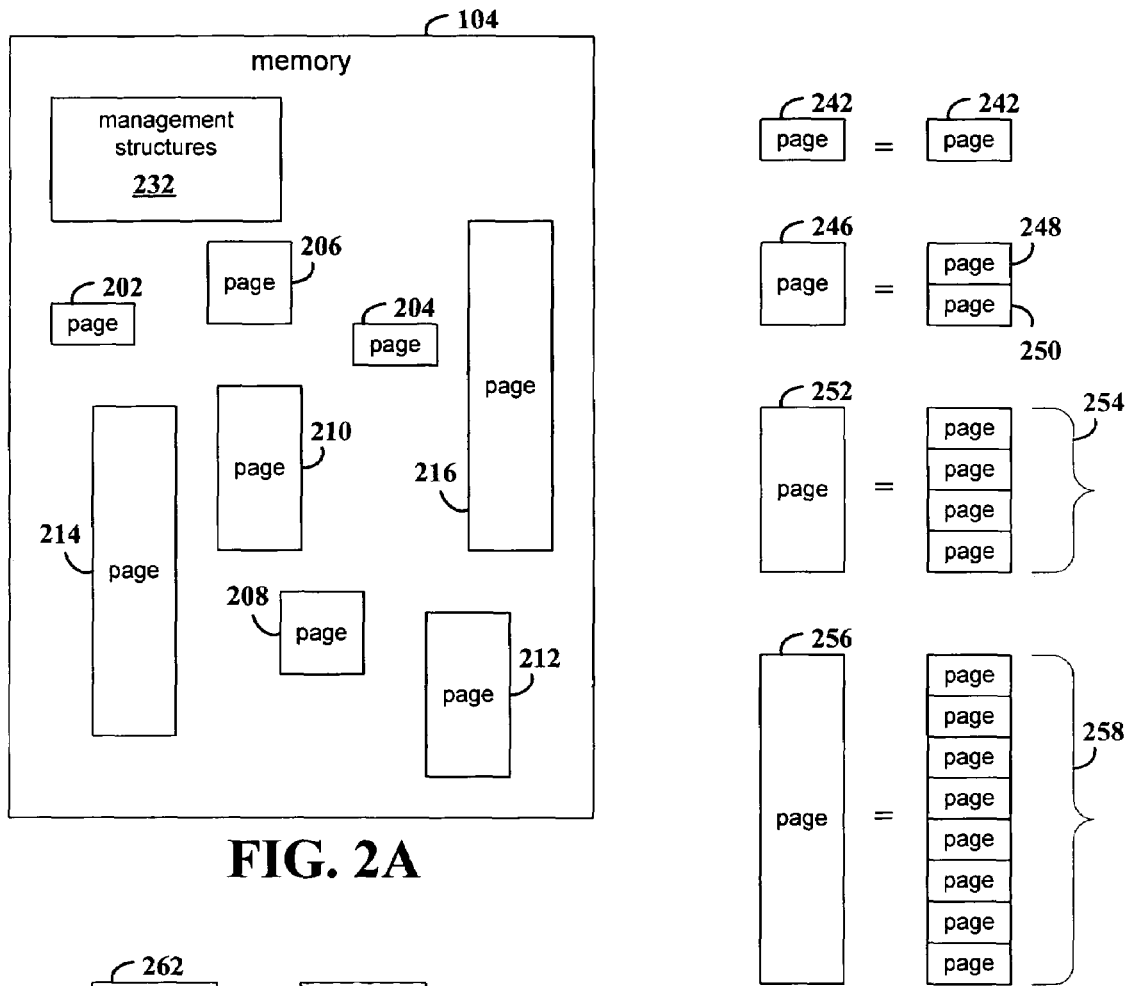
FIG. 2A illustrates example pages of different sizes and an accompanying page index used by the virtual memory system in managing the different size pages.
FIG. 2B shows example pages of different sizes and underlying subpages used by the virtual memory system in managing the pages.
FIG. 2C illustrates an example base page 262, constituent subpages 264, 266, 268, and 270, and management information stored with each subpage.

FIG. 2A illustrates example pages of different sizes and an accompanying page index used by the virtual memory system in managing the different size pages. For ease of illustration, the example sizes of pages increase by doubling each successive page size. For example, pages 202 and 204 may be 4 KB pages, pages 206 and 208 may be 8 KB pages, pages 210 and 212 may be 16 KB pages, and pages 214 and 216 may be 32 KB pages. Other implementations may have different page sizes to satisfy various design requirements. For example, the page sizes may increase by quadrupling each successive page size.

In demoting a page it will be appreciated that various hardware dependent and implementation dependent data structures 232 need to be updated to track the separate pages. These structures track, for example, the logical number of each virtual page, the associated location of the virtual page in retentive storage 108, and the physical address of the virtual page in the memory subsystem 104. It will be appreciated that once a page is demoted, swapping of the resulting pages between memory and retentive storage may change the physical memory addresses of the resulting pages.

FIG. 2B shows example pages of different sizes and underlying subpages used by the virtual memory system in managing the pages. The basic page size is shown by page 242, and a page of the basic page size has no subpages. The examples of pages larger than the basic page size have 2, 4, or 8 subpages. For example, page 246 includes subpages 248 and 250, page 252 include subpages 254, and page 256 include subpages 258. Each of the subpages 248, 250, 254, and 258 is equal in size to the basic page size. In the present description, pages 242, 246, 252, and 256 are referred to as "base" pages. It will be appreciated that many different combinations or additional virtual pages sizes may be implemented to suit different implementation requirements.

FIG. 2C illustrates an example base virtual page 262, constituent subpages 264, 266, 268, and 270, and management information stored with each subpage. The management information of interest is referenced as the base size. The value of the base size is stored in each subpage of a base virtual page, and the value indicates the size of the base virtual page. For example, the value of the base size 272 stored in subpage 264 is the size of base virtual page 262. The same value is stored for base sizes 274, 276, and 278. The base size is used, as explained below, in support of demoting a page.

Figure 3A:
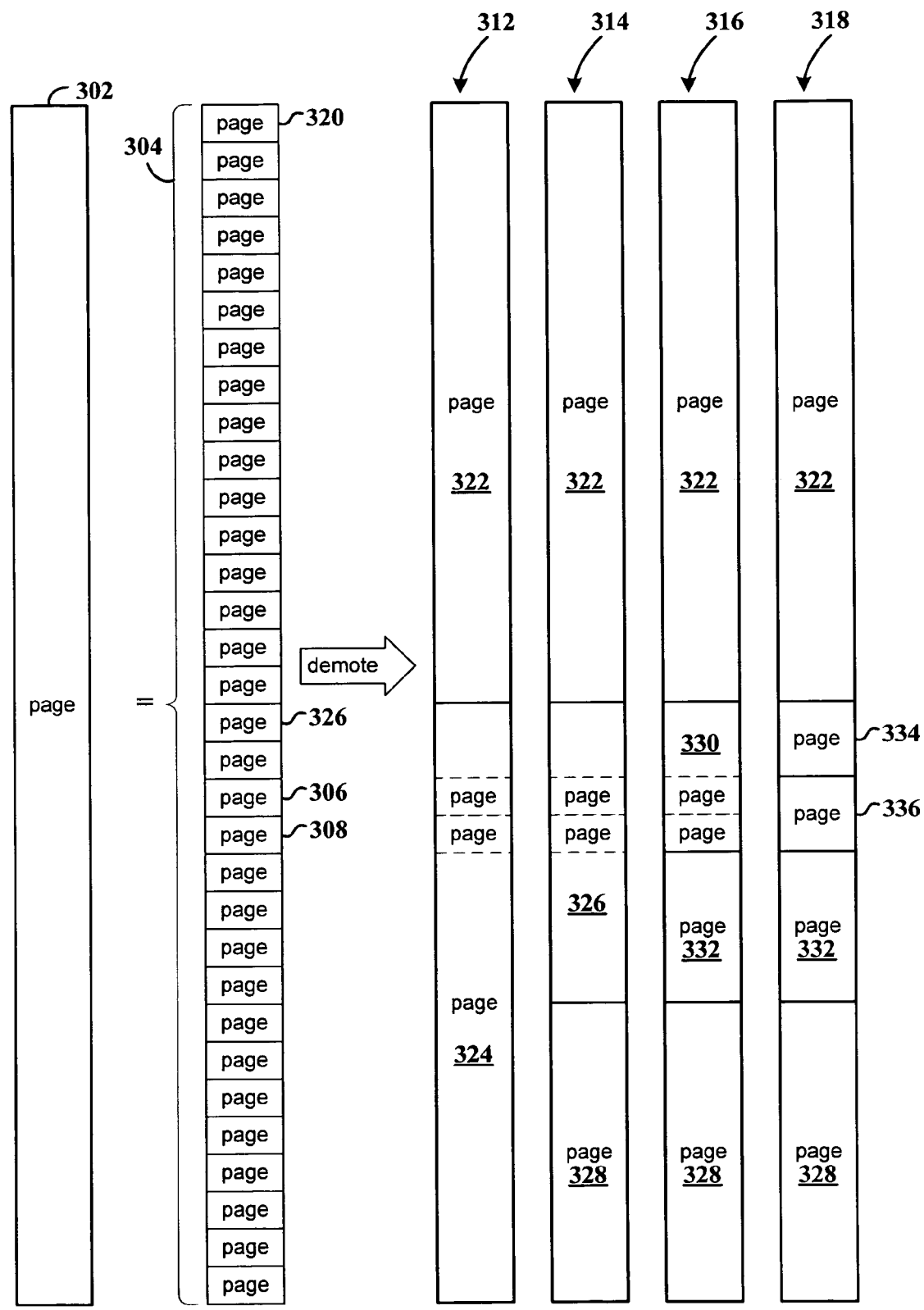
FIG. 3A illustrates the demotion of an example page.

FIG. 3A illustrates the demotion of an example page, and FIG. 3B illustrates an example process for demoting a page in accordance with various embodiments of the invention. Page 302 has 32 subpages 304. The portion of page 302 that is desired to be a separate page includes subpages 306 and 308. Pages 312 include the resulting pages after a first iteration of a processing loop in the DEMOTE PAGE process 350 of FIG. 3B, pages 314 include the resulting pages after a second iteration of the loop, pages 316 include the resulting pages after a third iteration of the loop, and pages 318, include the resulting pages after the final iteration of the loop.

The DEMOTE PAGE process 350 receives as input parameters, subpage_pointer and required_page_size. The subpage_pointer references a subpage 306 of the larger page 302 that is desired to be a separate page, and the required_page_size indicates the size of the page to be formed beginning at the subpage_pointer.

The DEMOTE PAGE process finds the first subpage of the base virtual page that includes the page referenced by the subpage_pointer (step 352). For example, subpage 320 is the first subpage of page 302. The base subpage may be determined from any subpage by finding the size of the base virtual page (from the base size in the subpage, FIG. 2C) and then counting back to the first physical address that is aligned on this size. For example, assuming each subpage of page 302 is 2 KB, if the subpage 306 is at address 70 K and is part of 64 KB page 302, the base virtual page starts at address 64 K because the base virtual page must be aligned on a 64 K boundary. In an example embodiment, a virtual page of a particular size is aligned on a physical address that is a multiple of that size.

The DEMOTE PAGE process also sets the current_page_size variable to the size of the encompassing page (step 354) before beginning the processing loop commencing at step 356. This processing loop continues until the current_page_size is reduced to the input required_page_size. With reference to FIG. 3A, the current_page_size is initially set to 64 KB, which is the size of page 302, and the required_page_size is 4 KB.

In the processing loop, the current_page_size is reduced to the next smallest page size available (step 358). In the example of FIG. 3A, if the current_page_size is 64 KB, the next smallest page size is 32 KB. The DEMOTE PAGE process then demotes the base virtual page to pages of the current_page_size (step 360). In the first iteration as applied to page 302 of FIG. 3A, the 64 KB page is demoted to two 32 KB pages 322 and 324. In demoting page 302 to the two pages 322 and 324, the virtual page management structures 232 are updated to reference the two resulting pages instead of the single original page. Specifically, the management structure is updated with the logical number of each virtual page 322 and 324, the associated locations of the virtual pages in retentive storage 108, and the physical addresses of the virtual pages in the memory subsystem 104. In addition, the base size values in each of the resulting pages 322 and 324 are set to the size of the resulting pages, for example, 32 KB.

The DEMOTE PAGE process then finds the first subpage of the new base virtual page (step 362) before beginning the next iteration of the loop. The new base virtual page is page 324 because it contains the subpage referenced by the input subpage_pointer, and the first subpage is subpage 326.

Page 314 shows the resulting pages after the second iteration of the loop on the example of FIG. 3A. Page 324 from the previous iteration is demoted to pages 326 and 328. In the next iteration (pages 316), page 326, which contains the subpages 306 and 308, is demoted to pages 330 and 332. After the final iteration, page 330 is demoted into pages 334 and 336.

The DEMOTE PAGE process may be implemented as an operating system function that is callable by various components in the operating system. Depending on security requirements, the DEMOTE PAGE function may also be callable by application level processes.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of memory management systems and has been found to be particularly applicable and beneficial in managing virtual memory pages in a system supporting different page sizes. It will be appreciated that the techniques described herein for management of virtual memory pages could also be applied to management of physical memory pages. Still other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for demoting a page in memory, comprising:

in response to a request to demote a specified subpage of a base page that includes a plurality of subpages, wherein the base page is one size of a plurality of available page sizes, establishing a first new page from the subpage with a selected size of the plurality of sizes;

storing a value indicating a size of the base page size in each subpage of the base page; and for each portion of the base page less the first new page, selecting as a first page size a largest of the plurality of page sizes that is less than or equal to the size of the portion;

dividing the portion into one or more pages of the first page size and updating the value of the base page size in the one or more pages; and in response to a total size of the one or more pages being less than a size of the portion, repeating the steps of selecting and dividing using as the portion of the base page, a part of portion not encompassed by the one or more pages.

2. The method of claim 1, further comprising, in response to the request further including a required page size parameter, wherein establishing the first new page includes using the size specified by the page size parameter as the selected size.

3. The method of claim 2, wherein a ratio of a first of the plurality of sizes to a second of the plurality of sizes that is successive to the first of the plurality of sizes is $m*b^e$: $m*b^{e+1}$, wherein m is a number of bytes greater than or equal to 512, b is an integer greater than 1, and e is an integer that is greater than or equal to 1 and less than a selected maximum value.

4. The method of claim 3, wherein b equals 4.

5. The method of claim 3, wherein b equals 2.

6. The method of claim 1, wherein a ratio of a first of the plurality of sizes to a second of the plurality of sizes that is successive to the first of the plurality of sizes is $m*b^e$: $m*b^{e+1}$, wherein m is a number of bytes greater than or equal to 512, b is an integer greater than 1, and e is an integer that is greater than or equal to 1 and less than a selected maximum value.

7. The method of claim 1, wherein each page of a particular size is aligned on an address that is multiple of that particular size, the method further comprising determining an address of the base page from the value of the base page size in the subpage.

8. An apparatus for demoting a page in memory, comprising:

means, responsive to a request to demote a specified sub-page of a base page that includes a plurality of subpages, wherein the base page is one size of a plurality of available page sizes, for establishing a first new page from the subpage with a selected size of the plurality of sizes; and means for storing a value indicating a size of the base page size in each subpage of the base page; and means for selecting, for each portion of the base page less the first new page, as a first page size a largest of the plurality of page sizes that is less than or equal to the size of the portion;

means for dividing, for each portion of the base page less the first new page, the portion into one or more pages of the first page size and for updating the value of the base page size in the one or more pages; and means, responsive to a total size of the one or more pages being less than a size of the portion, for actuating the selecting means and dividing means using as the portion of the base page, a part of portion not encompassed by the one or more pages.

9. The apparatus of claim 8, further comprising, means, responsive to the request further including a required page size parameter, for using the size specified by the page size parameter as the selected size.

10. A program storage device, comprising:
a processor-readable medium configured with instructions executable by the processor for demoting a page in memory by performing the operations of,
in response to a request to demote a specified subpage of a base page that includes a plurality of subpages, wherein the base page is one size of a plurality of available page sizes, establishing a first new page from the subpage with a selected size of the plurality of sizes;
storing a value indicating a size of the base page size in each subpage of the base page; and
for each portion of the base page less the first new page,
selecting as a first page size a largest of the plurality of page sizes that is less than or equal to the size of the portion;
dividing the portion into one or more pages of the first page size and updating the value of the base page size in the one or more pages; and
in response to a total size of the one or more pages being less than a size of the portion, repeating the steps of selecting and dividing using as the portion of the base page, a part of portion not encompassed by the one or more pages.

11. The program storage device of claim 10, wherein the processor-readable medium is further configured with instructions for performing the operation, in response to the request further including a required page size parameter, using the size specified by the page size parameter as the selected size.

12. The program storage device of claim 11, wherein the processor-readable medium is further configured with instructions for implementing the plurality of page sizes, wherein a ratio of a first of the plurality of sizes to a second of the plurality of sizes that is successive to the first of the plurality of sizes is $m*b^e : m*b^{e+1}$, wherein m is a number of bytes greater than or equal to 512, b is an integer greater than 1, and e is an integer that is greater than or equal to 1 and less than a selected maximum value.

13. The program storage device of claim 12, wherein b equals 4.

14. The program storage device of claim 12, wherein b equals 2.

15. The program storage device of claim 10, wherein the processor-readable medium is further configured with instructions for implementing the plurality of page sizes, wherein a ratio of a first of the plurality of sizes to a second of the plurality of sizes that is successive to the first of the plurality of sizes is $m*b^e : m*b^{e+1}$, wherein m is a number of bytes greater than or equal to 512, b is an integer greater than 1, and e is an integer that is greater than or equal to 1 and less than a selected maximum value.

16. The program storage device of claim 10, wherein each page of a particular size is aligned on an address that is multiple of that particular size, and the processor-readable medium is further configured with instructions for performing the operation of determining an address of the base page from the value of the base page size in the subpage.

17. A program storage device, comprising:
a processor-readable medium configured with instructions executable by the processor for demoting a page in memory by performing the operations of,
in response to a request to demote a specified subpage of an encompassing page, wherein the encompassing page is one size of a plurality of available page sizes, performing the steps including,
storing a value indicating a size of the encompassing page size in each subpage of the encompassing page; and
determining a first subpage in the encompassing page;
determining a size of the encompassing page, and using the size as the current size;
dividing the encompassing page into a plurality of pages of sizes equal to a next size smaller than the current size and updating the value of the base page size in the one or more pages;
using a one of the plurality of pages having the specified subpage as the encompassing page; and
repeating the steps of determining the first subpage, determining the size, dividing the encompassing page, and using a one of the plurality of pages until the current size of the encompassing page is reduced to a selected size.

18. The program storage device of claim 17, wherein the processor-readable medium is further configured with instructions for performing the operation, in response to the request further including a required page size parameter, using the size specified by the page size parameter as the selected size.

19. The program storage device of claim 17, wherein each page of a particular size is aligned on an address that is multiple of that particular size, and the processor-readable medium is further configured with instructions for performing the operation of determining an address of the encompassing page from the value of the base page size in the subpage.

* * * * *